US011929014B2

(12) United States Patent
Pyun et al.

(10) Patent No.: US 11,929,014 B2
(45) Date of Patent: Mar. 12, 2024

(54) DISPLAY DEVICE AND METHOD OF DRIVING THE SAME

(71) Applicant: Samsung Display Co., Ltd., Yongin-si (KR)

(72) Inventors: Kihyun Pyun, Gwangmyeong-si (KR); Sung-Mo Yang, Hwaseong-si (KR); Seungho Park, Suwon-si (KR); Dae-Sik Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 50 days.

(21) Appl. No.: 17/869,218

(22) Filed: Jul. 20, 2022

(65) Prior Publication Data

US 2023/0186831 A1 Jun. 15, 2023

(30) Foreign Application Priority Data

Dec. 14, 2021 (KR) ........................ 10-2021-0178719

(51) Int. Cl.
*G09G 3/32* (2016.01)

(52) U.S. Cl.
CPC ....... *G09G 3/32* (2013.01); *G09G 2300/0828* (2013.01); *G09G 2320/0271* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2005/0007392 A1* | 1/2005 | Kasai | .................. | G09G 3/3275 345/690 |
| 2015/0243211 A1* | 8/2015 | Pyo | .......................... | G09G 3/20 345/212 |
| 2021/0193058 A1* | 6/2021 | Lee | ...................... | G09G 3/3406 |

FOREIGN PATENT DOCUMENTS

| | | |
|---|---|---|
| KR | 1020140141175 A | 12/2014 |
| KR | 101983368 B1 | 5/2019 |
| KR | 102016153 B1 | 8/2019 |

* cited by examiner

*Primary Examiner* — Nicholas J Lee
(74) *Attorney, Agent, or Firm* — CANTOR COLBURN LLP

(57) ABSTRACT

A display device includes a display panel which displays an image based on input image data, a driving controller which generates a voltage control signal for adjusting a first power voltage applied to the display panel in an (N+M)-th frame based on a maximum grayscale value of the input image data of an N-th frame, where N is a positive integer, and M is a positive integer, and a power voltage generator which senses a power current applied to the display panel in the (N+M)-th frame, generates a second power voltage based on the voltage control signal, and controls a voltage level of the first power voltage based on the second power voltage and a current level of the power current.

20 Claims, 12 Drawing Sheets

DISPLAY DEVICE AND METHOD OF DRIVING THE SAME

This application claims priority to Korean Patent Application No. 10-2021-0178719, filed on Dec. 14, 2021, and all the benefits accruing therefrom under 35 U.S.C. § 119, the content of which in its entirety is herein incorporated by reference.

BACKGROUND

1. Field

Embodiments relate generally to a display device and a method of driving the display device. More particularly, embodiments relate to a display device that adjusts a luminance of a display panel based on a load of input image data and prevents the display panel from being damaged by occurrence of an overcurrent and a method of driving the display device.

2. Description of the Related Art

Generally, a display device may include a display panel, a driving controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The driving controller may control the gate driver and the data driver.

SUMMARY

In a display device, if a luminance of a display panel thereof is not adjusted based on a load of input image data, an overcurrent may flow in a data driver or a display panel thereof, thereby damaging the data driver or the display panel.

A delay of M frame may occur in a process of determining a load of input image data, where M is a positive integer. Due to the delay of M frame, when input image data that is not subject to a luminance adjustment is input in an (N−M)-th frame and when input image data that is subject to the luminance adjustment is input in an N-th frame, the luminance adjustment may not be immediately performed in the N-th frame, so that an overcurrent may flow in the display panel during the N-th frame. As a result, the display panel or the data driver may be damaged.

Embodiments of the invention provide a display device capable of preventing a display panel from being damaged by occurrence of an overcurrent by sensing a power current applied to the display panel and controlling a power voltage based on a current level of the power current.

Embodiments of the invention t also provide a method of driving a display device capable of preventing a display panel from being damaged by occurrence of an overcurrent by sensing a power current applied to the display panel and controlling a power voltage based on a current level of the power current.

According to embodiments of the invention, a display device includes a display panel which displays an image based on input image data, a driving controller which generates a voltage control signal for adjusting a first power voltage applied to the display panel in an (N+M)-th frame based on a maximum grayscale value of the input image data of an N-th frame, where N is a positive integer, and M is a positive integer, and a power voltage generator which senses a power current applied to the display panel in the (N+M)-th frame, generates a second power voltage based on the voltage control signal, and controls a voltage level of the first power voltage based on the second power voltage and a current level of the power current.

In an embodiment, the driving controller may determine a scale factor for adjusting a grayscale value of the input image data of the (N+M)-th frame based on a load of the input image data of the N-th frame and a grayscale adjustment reference value.

In an embodiment, the power voltage generator may include a power voltage generating block which generates the first power voltage and the second power voltage based on an input voltage and the voltage control signal, and controls the voltage level of the first power voltage based on the second power voltage and an analog voltage, a power voltage supply which applies the input voltage to the power voltage generating block, a reference current calculator which calculates a reference current based on a voltage level of the second power voltage and a reference power consumption lookup table, a current sensing block which senses the power current and generates a voltage drop signal based on the current level of the power current and the reference current, a voltage code generating block which outputs a power voltage code based on the voltage drop signal and a voltage code lookup table, and a power voltage digital-to-analog converter (DAC) block which generates the analog voltage based on the power voltage code.

In an embodiment, the reference current calculator may receive a reference power consumption from the reference power consumption lookup table, and to calculate the reference current by dividing the reference power consumption by the voltage level of the second power voltage.

In an embodiment, the reference power consumption may include a first reference power consumption, a second reference power consumption greater than the first reference power consumption, and a third reference power consumption greater than the second reference power consumption, the reference current may include a first reference current, a second reference current, and a third reference current, the first reference current may be calculated by dividing the first reference power consumption by the voltage level of the second power voltage, the second reference current may be calculated by dividing the second reference power consumption by the voltage level of the second power voltage, and the third reference current may be calculated by dividing the third reference power consumption by the voltage level of the second power voltage.

In an embodiment, the third reference power consumption may be less than or equal to a maximum power consumption of the power voltage supply.

In an embodiment, the current sensing block may output a first voltage drop signal with an activation level when the power current is greater than the first reference current, output a second voltage drop signal with an activation level when the power current is greater than the second reference current, and output a third voltage drop signal with an activation level when the power current is greater than the third reference current, In an embodiment, the voltage code generating block may receive the voltage drop signal from the current sensing block, receive a vertical start signal from the driving controller, and calculate an activation start time of the voltage drop signal based on the vertical start signal.

In an embodiment, the voltage code generating block may output the power voltage code corresponding to a type of the voltage drop signal and the activation start time of the voltage drop signal among a plurality of power voltage codes stored in the voltage code lookup table.

In an embodiment, the power voltage generating block may receive the analog voltage from the power voltage DAC block and control the voltage level of the first power voltage based on the analog voltage.

In an embodiment, the driving controller may further include a load sum calculator which receives the input image data of the N-th frame to calculate a sum of all grayscale values of the input image data of the N-th frame, and a load calculator which receives the sum of all grayscale values of the input image data of the N-th frame to calculate the load of the input image data of the N-th frame.

In an embodiment, the driving controller further may include a maximum grayscale value calculator which receives the input image data of the N-th frame and calculates the maximum grayscale value of the input image data of the N-th frame.

In an embodiment, the driving controller may further include a voltage control signal generating block which generates the voltage control signal for adjusting the first power voltage applied to the display panel in the (N+M)-th frame based on the load of the input image data of the N-th frame, the maximum grayscale value of the input image data of the N-th frame, and a voltage control lookup table, and a grayscale adjuster which determines the scale factor for adjusting the grayscale value of the input image data of the (N+M)-th frame based on the load of the input image data of the N-th frame and the grayscale adjustment reference value.

According to embodiments of the invention, a method of driving a display device includes generating a voltage control signal for adjusting a first power voltage applied to a display panel of the display device in an (N+M)-th frame based on a maximum grayscale value of input image data of an N-th frame, where N is a positive integer, and M is a positive integer, sensing a power current applied to the display panel in the (N+M)-th frame, generating a second power voltage based on the voltage control signal, and controlling a voltage level of the first power voltage based on the second power voltage and a current level of the power current.

In an embodiment, the method may further include determining a scale factor for adjusting a grayscale value of the input image data of the (N+M)-th frame based on a load of the input image data of the N-th frame and a grayscale adjustment reference value.

In an embodiment, the controlling the voltage level of the first power voltage may include calculating a reference current based on a voltage level of the second power voltage and a reference power consumption lookup table, generating a voltage drop signal based on the current level of the power current and the reference current, outputting a power voltage code based on the voltage drop signal and a voltage code lookup table, generating an analog voltage based on the power voltage code, and controlling the voltage level of the first power voltage based on the second power voltage and the analog voltage.

In an embodiment, the reference current may be calculated by dividing a reference power consumption received from the reference power consumption lookup table by the voltage level of the second power voltage.

In an embodiment, the reference power consumption may include a first reference power consumption, a second reference power consumption greater than the first reference power consumption, and a third reference power consumption greater than the second reference power consumption, the reference current may include a first reference current, a second reference current, and a third reference current, the first reference current may be calculated by dividing the first reference power consumption by the voltage level of the second power voltage, the second reference current may be calculated by dividing the second reference power consumption by the voltage level of the second power voltage, and the third reference current may be calculated by dividing the third reference power consumption by the voltage level of the second power voltage.

In an embodiment, the outputting the power voltage code may include outputting a first voltage drop signal with an activation level when the power current is greater than the first reference current, outputting a second voltage drop signal with an activation level when the power current is greater than the second reference current, and outputting a third voltage drop signal with an activation level when the power current is greater than the third reference current.

In an embodiment, the outputting the power voltage code may include calculating an activation start time of the voltage drop signal based on a vertical start signal, and outputting the power voltage code corresponding to a type of the voltage drop signal and the activation start time of the voltage drop signal among a plurality of power voltage codes stored in the voltage code lookup table.

In embodiments, the display device and the method of driving the display device may sense a power current applied to a display panel and may control a power voltage based on a current level of the power current. Thus, in such embodiments, the display device and the method of driving the display device may control a voltage level of the power voltage when an overcurrent flows in the display panel, such that occurrence of the overcurrent may be minimized (or substantially reduced), and the display panel may be effectively prevented from being damaged.

In embodiments, the display device and the method of driving the display device may prevent a power voltage supply from excessive heat generation and burnt by calculating a reference current based on a maximum power consumption of the power voltage supply.

DETAILED DESCRIPTION

Figure 1:
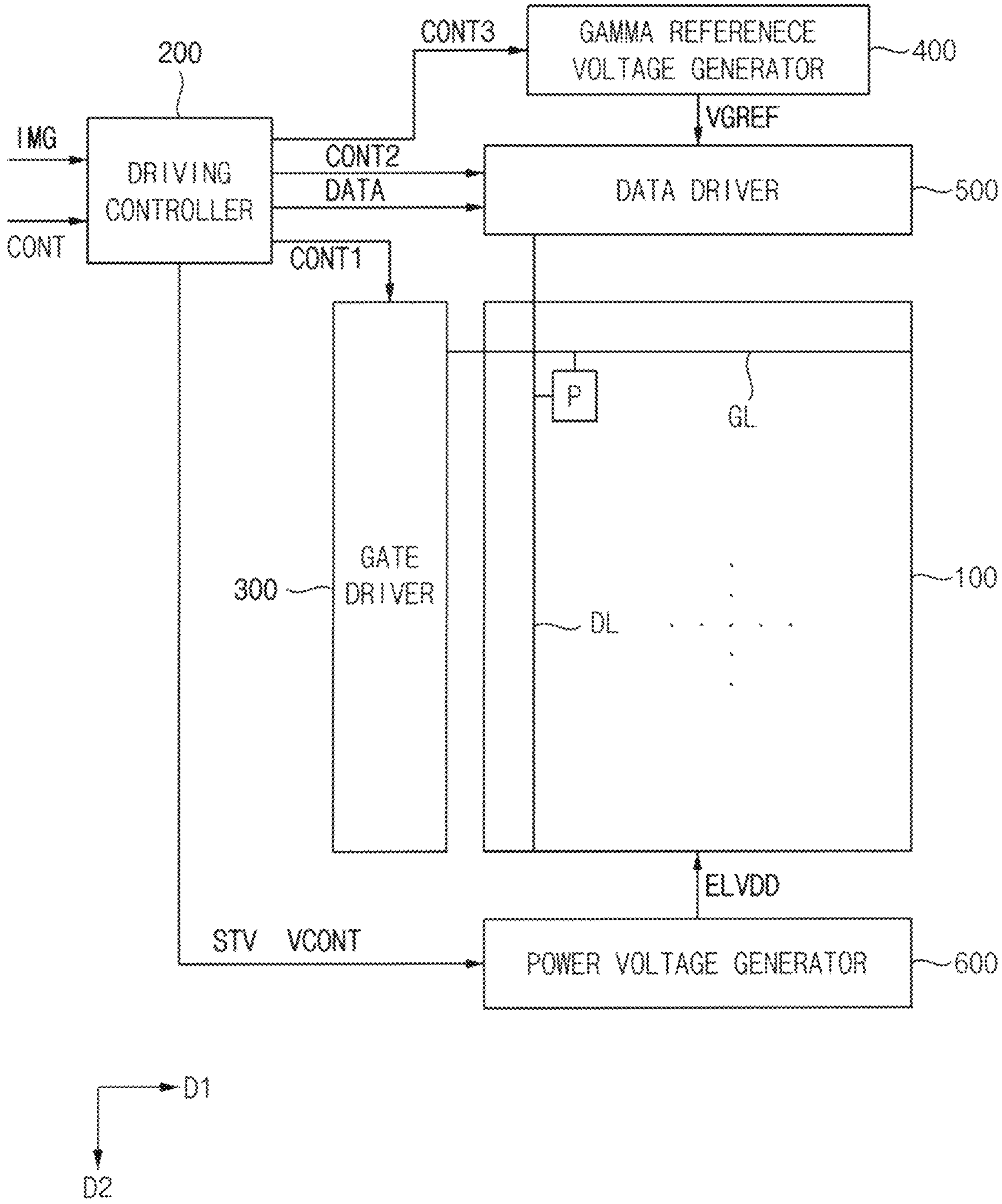
FIG. 1 is a block diagram illustrating a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

FIG. 1 is a block diagram showing a display device according to embodiments.

Referring to FIG. 1, an embodiment of a display device may include a display panel 100 and a display panel driver. The display panel driver may include a driving controller 200, a gate driver 300, a gamma reference voltage generator 400, a data driver 500, and a power voltage generator 600.

In an embodiment, for example, the driving controller 200 and the data driver 500 may be formed integrally with each other or defined by portions of a single module or chip. In an embodiment, for example, the driving controller 200, the gamma reference voltage generator 400, and the data driver 500 may be formed integrally with each other. A driving module in which at least the driving controller 200 and the data driver 500 are formed integrally with each other may be referred to as a timing controller-embedded data driver (TED).

The display panel 100 may include a display part for displaying an image, and a peripheral part that is adjacent to the display part.

The display panel 100 may include a plurality of gate lines GL, a plurality of data lines DL, and pixels P electrically connected to the gate lines GL and the data lines DL, respectively. The gate lines GL may extend in a first direction D1, and the data lines DL may extend in a second direction D2 intersecting the first direction Dl.

The driving controller 200 may receive input image data IMG and an input control signal CONT from an external device (not shown). In an embodiment, for example, the input image data IMG may include red image data, green image data, and blue image data. The input image data IMG may include white image data. In an embodiment, for example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT to output the generated second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT to output the generated third control signal CONT3 to the gamma reference voltage generator 400.

The driving controller 200 will be described in detail below with reference to FIGS. 2 to 5.

The gate driver 300 may generate gate signals for driving the gate lines GL in response to the first control signal CONT1 received from the driving controller 200. The gate driver 300 may output the gate signals to the gate lines GL. In an embodiment, for example, the gate driver 300 may sequentially output the gate signals to the gate lines GL. In an embodiment, for example, the gate driver 300 may be mounted on the peripheral part of the display panel. In an alternative embodiment, for example, the gate driver 300 may be integrated on the peripheral part of the display panel.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or the data driver 500.

The data driver 500 may receive the second control signal CONT2 and the data signal DATA from the driving controller 200, and may receive the gamma reference voltage VGREF from the gamma reference voltage generator 400. The data driver 500 may convert the data signal DATA into an analog data voltage by using the gamma reference voltage VGREF. The data driver 500 may output the data voltage to the data line DL.

The power voltage generator 600 may generate a voltage for driving at least one selected from the display panel 100, the driving controller 200, the gate driver 300, the gamma reference voltage generator 400, and the data driver 500. In an embodiment, for example, the power voltage generator 600 may generate a low power voltage, and output the low power voltage to the pixel P. In an embodiment, the power voltage generator 600 may generate an analog power voltage, and output the analog power voltage to the data driver 500. In an embodiment, the power voltage generator 600 may generate a high gate voltage and a low gate voltage, and output the high gate voltage and the low gate voltage to the gate driver 300. In such an embodiment, the power voltage generator 600 may include a DC-DC converter.

In an embodiment, the power voltage generator 600 may receive a vertical start signal STV and a voltage control signal VCONT from the driving controller 200. The vertical start signal STV may be a signal representing the start of one frame. The voltage control signal VCONT will be described in detail later. The power voltage generator 600 may generate a first power voltage ELVDD based on the vertical start signal STV and the voltage control signal VCONT. The power voltage generator 600 may output the first power voltage ELVDD to the display panel 100.

The power voltage generator 600 will be described in detail below with reference to FIGS. 6 to 12.

Figure 2:
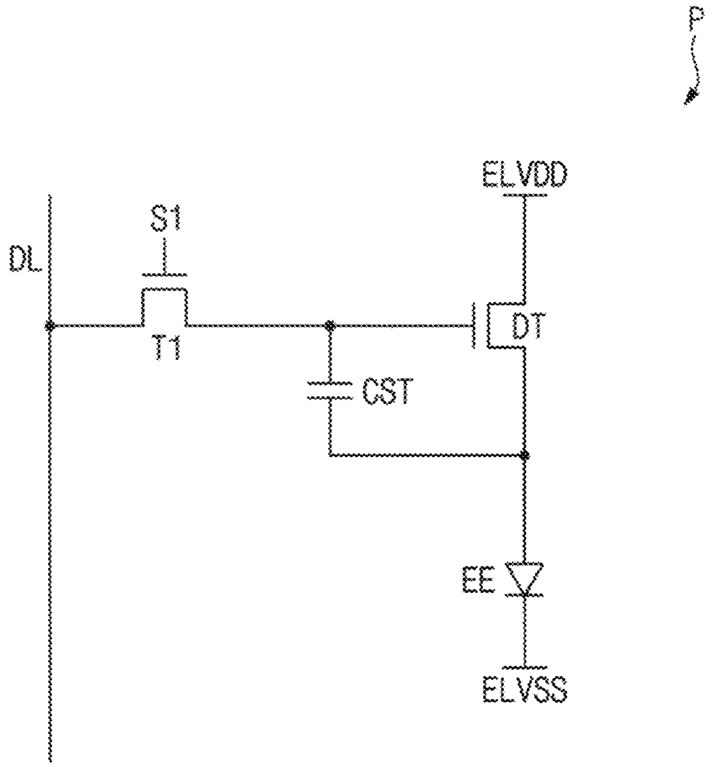
FIG. 2 is a circuit diagram illustrating an embodiment of the pixel of FIG. 1.
Figure 3:
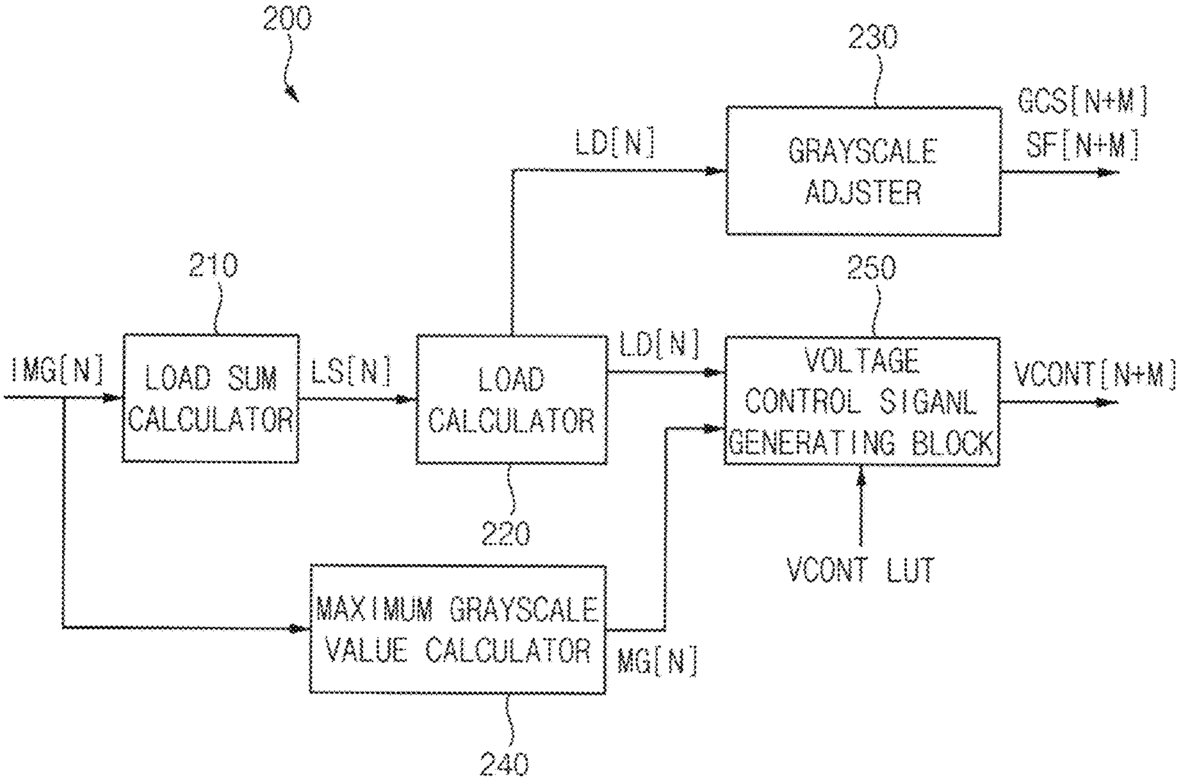
FIG. 3 is a block diagram illustrating a driving controller of FIG. 1.
Figure 4:
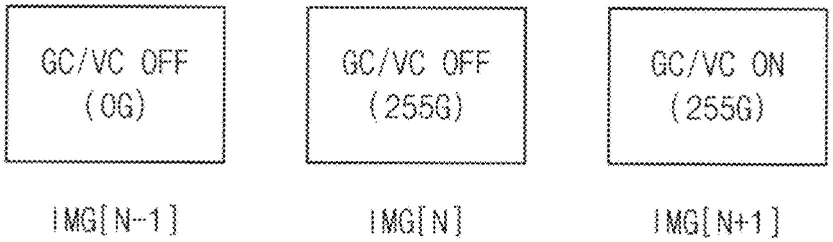
FIG. 4 is a diagram illustrating an embodiment of a driving controller and input image data of the display device of FIG. 1 when the input image data of an (N−1)-th frame represents 0 grayscale value, and the input image data of an N-th frame and the input image data of an (N+M)-th frame represent 255 grayscale value.
Figure 5:
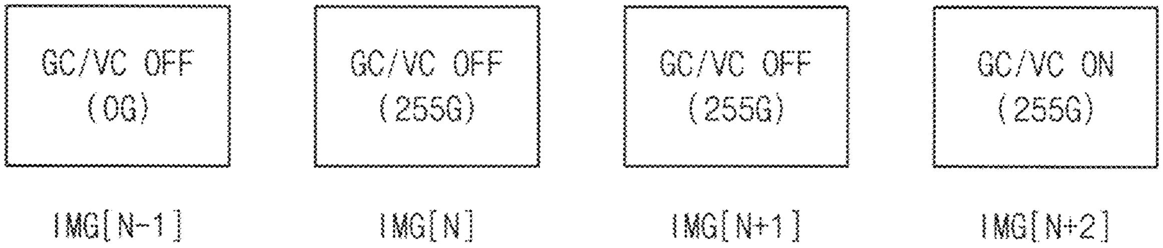
FIG. 5 is a diagram illustrating an embodiment of a driving controller and input image data of the display device of FIG. 1 when the input image data of an (N−1)-th frame represents 0 grayscale value, and the input image data of an N-th frame, the input image data of an (N+M)-th frame and the input image data of an (N+2)-th frame represent 255 grayscale value.
Figure 6:
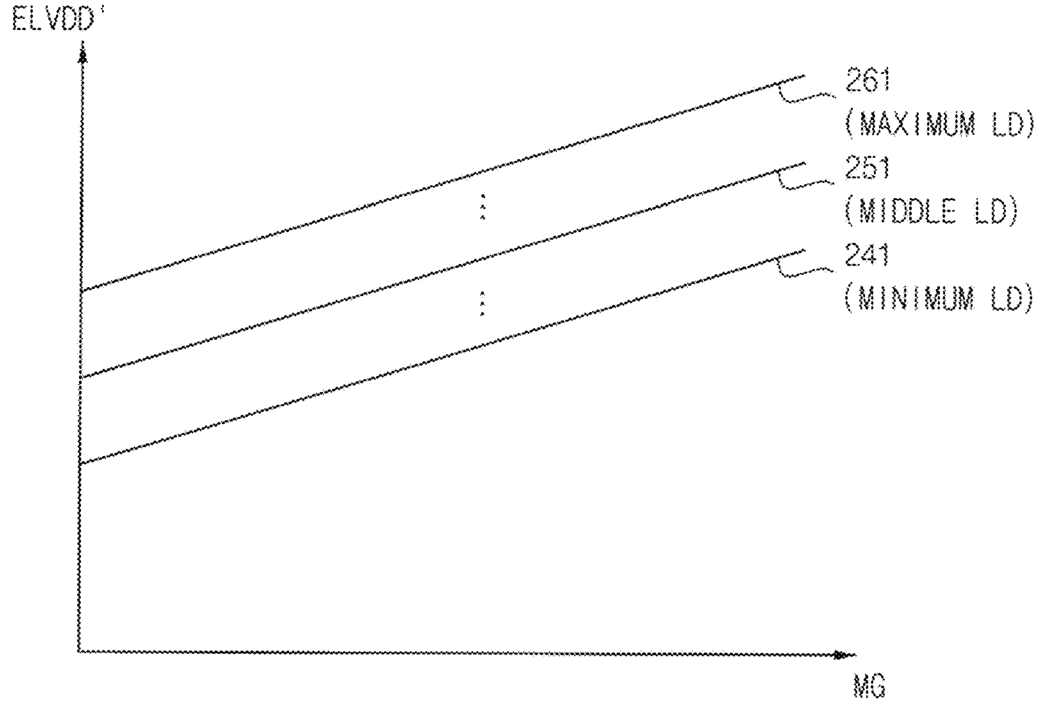
FIG. 6 is a diagram for explaining a voltage level of a power voltage determined according to a load and a maximum grayscale value.
Figure 7:
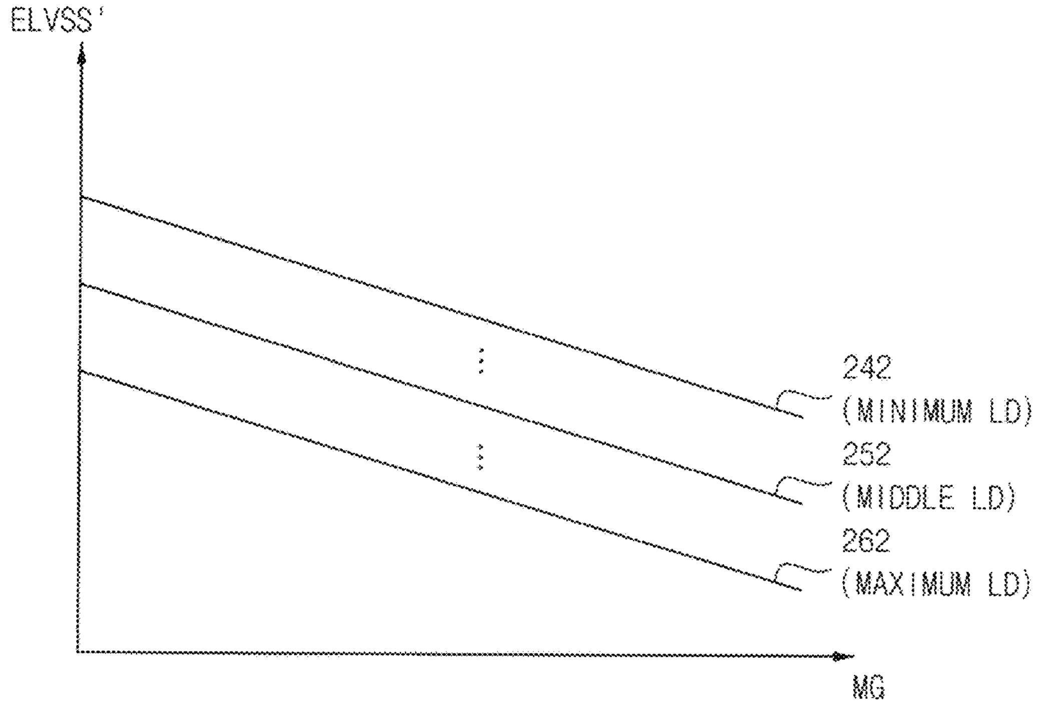
FIG. 7 is a diagram for explaining a voltage level of a ground power voltage determined according to a load and a maximum grayscale value.

FIG. 2 is a circuit diagram illustrating an embodiment of the pixel P of FIG. 1, FIG. 3 is a block diagram illustrating the driving controller 200 of FIG. 1, FIG. 4 is a diagram illustrating an embodiment of the driving controller 200 and the input image data of the display device of FIG. 1 when the input image data of an (N−1)-th frame represents 0 grayscale value, and the input image data of an N-th frame and the input image data of an (N+M)-th frame represent 255 grayscale value, FIG. 5 is a diagram illustrating an embodiment of the driving controller 200 and the input image data of the display device of FIG. 1 when the input image data of an (N−1)-th frame represents 0 grayscale value, and the input image data of an N-th frame, the input image data of an (N+M)-th frame and the input image data of an (N+2)-th frame represent 255 grayscale value, FIG. 6 is a diagram for explaining a voltage level of a power voltage determined according to a load LD and a maximum grayscale value MG, and FIG. 7 is a diagram for explaining a voltage level of a ground power voltage determined according to the load LD and the maximum grayscale value MG.

Referring to FIG. 2, in an embodiment, each of the pixels P may include a first switching transistor T1 that applies the data voltage to a control electrode of a driving transistor DT (i.e., a first node N1) in response to a first gate signal S1, a storage capacitor storing the data voltage, the driving transistor DT that generates a driving current in response to the data voltage, and a light emitting element EE that emits light based on the driving current.

In an embodiment, for example, the first switching transistor T1 may include a control electrode that receives the first gate signal S1, an input electrode connected to the data line DL, and an output electrode connected to the first node N1. The storage capacitor CST may include a first electrode connected to the first node N1 and a second electrode connected to a second node N2. The driving transistor DT may include the control electrode connected to the first node N1, an input electrode that receives the first power voltage ELVDD, and an output electrode connected to the second node N2. The light emitting element EE may include a first electrode connected to the second node N2 and a second electrode that receives a first ground power voltage ELVSS.

Referring to FIGS. 1 to 3, the driving controller 200 may include a load sum calculator 210, a load calculator 220, a grayscale adjuster 230, a maximum grayscale value calculator 240, and a voltage control signal generating block 250.

The load sum calculator 210 may receive the input image data IMG[N] of an N-th frame to calculate a sum LS[N] of all grayscale values of the input image data IMG[N] of the N-th frame. In an embodiment, for example, the load sum calculator 210 may divide the display panel 100 into a plurality of blocks to calculate a sum of grayscale values of each of the blocks. The load sum calculator 210 may sum up sums of the grayscale values of the blocks to calculate the sum LS [N] of all grayscale values of the input image data IMG[N] of the N-th frame. Here, N is a positive integer.

The load calculator 220 may receive the sum LS[N] of all grayscale values of the input image data IMG[N] of the N-th frame to calculate a load LD[N] of the input image data IMG[N] of the N-th frame. In an embodiment, the load LD[N] may have a value between 0% and 100%. In such an embodiment, for example, when the input image data IMG [N] of the N-th frame has a full black image, the load LD[N] may be 0%. In such an embodiment, for example, when the input image data IMG[N] of the N-th frame has a full white image, the load LD[N] may be 100%. In an embodiment, as described above, the display device calculates the load LD[N] based on the sum of all grayscale values LS[N], but the invention is not limited thereto. In an alternative embodiment, for example, the display device may calculate an average of grayscale values of the input image data IMG[N] of the N-th frame, and calculate the load LD[N] based on the average.

The grayscale adjuster 230 may determine a scale factor SF[N+M] for adjusting a grayscale value of the input image data of an (N+M) frame based on the load LD[N] of the input image data IMG[N] of the N-th frame and a grayscale adjustment reference value. In addition, the grayscale adjuster 230 may generate a grayscale adjustment signal GCS [N+M] representing whether a grayscale adjustment operation is activated or deactivated in the input image data of the (N+M) frame. The scale factor SF[N+M] may have a value that is less than or equal to 1 to maintain or reduce a grayscale value of the input image data.

The grayscale adjuster 230 may activate the grayscale adjustment operation when the load LD[N] of the input image data IMG[N] of the N-th frame exceeds the grayscale adjustment reference value.

The grayscale adjuster 230 may allow the scale factor SF[N+M] to have a value that is less than 1 when the grayscale adjustment operation is activated because the load LD[N] of the input image data IMG[N] of the N-th frame exceeds the grayscale adjustment reference value. In an embodiment, for example, when the scale factor SF[N+M] is 0.5, the grayscale value of the input image data IMG[N+M] of the (N+M) frame may be reduced by half as compared with an input gray scale.

The maximum grayscale value calculator 240 may receive the input image data IMG[N] of the N-th frame, and calculate the maximum grayscale value MG[N] of the input image data IMG[N] of the N-th frame. In an embodiment, for example, when the input image data IMG[N] of the N-th frame represents grayscale values from a 0 grayscale value to 100 grayscale value, the maximum grayscale value calculator 240 may determine the maximum grayscale value MG[N] as the 100 grayscale value.

The voltage control signal generating block 250 may generate the voltage control signal VCONT[N+M] for adjusting the first power voltage ELVDD applied to the display panel 100 in the (N+M)-th frame based on the maximum grayscale value MG[N] of the input image data IMG[N] in the N-th frame, and output the voltage control signal VCONT[N+M] to the power voltage generator 600. The voltage control signal generating block 250 may generate the voltage control signal VCONT[N+M] to adjusting the first power voltage ELVDD applied to the display panel 100 in the (N+M)-th frame based on the load LD[N] of the input image data IMG[N] of an N-th frame, and the maximum grayscale value MG[N], and a voltage control lookup table VCONT LUT. In an embodiment, the voltage control signal generating block 250 may generate the voltage control signal VCONT[N+M] for adjusting the first ground power voltage ELVSS applied to the display panel 100 in the (N+M)-th frame based on the maximum grayscale value MG[N] of the input image data IMG[N] in the N-th frame. That is, the power voltage generator 600 may generate the first power voltage ELVDD applied to the display panel 100 in the (N+M)-th frame based on the voltage control signal VCONT[N+M] generated based on the input image data IMG[N] of the N-th frame. In an embodiment, the voltage control signal generating block 250 may generate a second power voltage ELVDD' (shown in FIG. 6) based on the input image data IMG[N] of the N-th frame, and control a voltage level of the first power voltage ELVDD based on the second power voltage ELVDD'. In an embodiment, the power voltage generator 600 may generate the first ground power voltage ELVSS applied to the display panel 100 in the (N+M)-th frame based on the voltage control signal VCONT [N+M] generated based on the input image data IMG[N] of the N-th frame. In an embodiment, the voltage control signal generating block 250 may generate a second ground power voltage ELVSS' (shown in FIG. 7) based on the input image data IMG[N] of the N-th frame, and control a voltage level of the first ground power voltage ELVSS based on the second ground power voltage ELVSS'. In an embodiment, the voltage control signal generating block 250 may generate the voltage control signal VCONT[N+M] to adjusting the first power voltage ELVDD and the first ground power voltage ELVSS, and generate the first power voltage and the first ground power voltage ELVSS applied to the display panel 100 in the (N+M)-th frame based on the voltage control signal VCONT[N+M].

In an embodiment, for example, the voltage control signal generating block 250 may generate a voltage control signal VCONT[N+M] representing a voltage level corresponding to the maximum grayscale value MG and the load LD of the input image data IMG. The voltage control signal generating block 250 may adjust the voltage levels of the first power voltage ELVDD and the second power voltage ELVDD'. That is, the voltage level of the first power voltage ELVDD before being controlled based on the second power voltage ELVDD' may be the same as a voltage level of the second power voltage ELVDD'. Accordingly, only the voltage level of the second power voltage ELVDD' will hereinafter be described with reference to FIG. 6. In an embodiment, as illustrated in FIG. 6, the voltage level of the second power voltage ELVDD' may be determined based on a first voltage level line 241 when the load LD is a minimum load MINIMUM LD (e.g., the full black image), may be determined according to a second voltage level line 251 higher than the first voltage level line 241 when the load LD is a middle load MIDDLE LD, and may be determined according to a third voltage level line 261 higher than the second voltage level line 251 when the load LD is a maximum load MAXIMUM LD (e.g., the full white image). In such an embodiment, each voltage level line 241, 251 and 261 may have a higher voltage level as the maximum grayscale value MG increases. Here, the middle load MIDDLE LD may mean an arbitrary load LD between the maximum load MAXIMUM LD and the minimum load MINIMUM LD.

In an embodiment, for example, the voltage control signal generating block 250 may generate a voltage control signal VCONT[N+M] representing a voltage level corresponding to the maximum grayscale value MG and the load LD of the input image data IMG. The voltage control signal generating block 250 may adjust the voltage levels of the first ground voltage ELVSS and the second ground voltage ELVSS'. That is, the voltage level of the first ground voltage ELVSS before being controlled based on the second ground voltage ELVSS' may be the same as a voltage level of the second ground voltage ELVSS'. Accordingly, only the voltage level of the second power voltage ELVDD' will hereinafter be described with reference to FIG. 7. In an embodiment, as illustrated in FIG. 7, the voltage level of the second ground voltage ELVSS' may be determined based on a first voltage level line 242 when the load LD is a minimum load MINIMUM LD (e.g., the full black image), may be determined according to a second voltage level line 252 higher than the first voltage level line 242 when the load LD is a middle load MIDDLE LD, and may be determined according to a third voltage level line 262 higher than the second voltage level line 252 when the load LD is a maximum load MAXIMUM LD (e.g., the full white image). In such an embodiment, each voltage level line 242, 252 and 262 may have a higher voltage level as the maximum grayscale value MG increases. Here, the middle load MIDDLE LD may mean an arbitrary load between the maximum load MAXIMUM LD and the minimum load MINIMUM LD.

In an embodiments, the driving controller 200 may further include an voltage control lookup table VCONT LUT that stores a plurality of voltage levels corresponding to a plurality of combinations of the load L of the input image data IMG and the maximum grayscale value MG of the input image data IMG, and the voltage control signal generating block 250 may output the voltage control signal VCONT for adjusting the first power voltage ELVDD and the second power voltage ELVDD' to have voltage levels corresponding to the load LD calculated by the load calculator 220 and the maximum grayscale value MG calculated by the maximum grayscale value calculator 240 among a plurality of voltage levels stored in the voltage control lookup table VCONT LUT. As described above, the first power voltage ELVDD is adjusted based on the load LD and the maximum grayscale value MG (hereinafter, referred to as a 'power voltage control operation VC'), such that the display device may reduce power consumption. In an embodiment, as described above, the display device may perform the power voltage control operation VC based on the load LD and the maximum grayscale value MG, but the invention is not limited thereto. In an alternative embodiment, for example, the display device may perform the power voltage control operation VC based on only the maximum grayscale MG. In such an embodiment, the voltage level of the first power voltage ELVDD may be adjusted to increase as the maximum grayscale MG of the input image data IMG increases, and the voltage level of the first ground power voltage ELVSS may be adjusted to increase as the maximum grayscale MG of the input image data IMG increases.

As shown in FIG. 3, a delay of more than one frame (i.e., a delay of M frame) may occur for the voltage control signal generating block 250 to determine the voltage control signal VCONT[N+M] and the scale factor SF[N+M]. Therefore, the voltage control signal generating block 250 may generate the voltage control signal VCONT[N+M] and the scale factor SF[N+M] applied in the (N+M)-th frame based on the input image data IMG[N] of the N-th frame data IMG[N]. As described above, when the delay occurs, in the N-th frame, the grayscale adjustment operation GC and the power voltage control operation VC may be not immediately applied, so that an overcurrent may flow in the display panel 100 and the data driver 500.

In a case, for example, as shown in FIG. 4, one frame delay may occur. When the input image data of an (N−1)-th frame represents 0 grayscale value, and the input image data of the N-th frame and the input image data of the (N+1)-th frame represent 255 grayscale value, due to the delay of one frame, the grayscale adjustment operation GC and the power voltage control operation VC may not be performed in the N-th frame. Here, N is greater than 2. In this case, a luminance of a display image of the N-th frame may be high, and the power current applied to the display panel 100 in the N-th frame may have an overcurrent level. As such, when an overcurrent flows through the display panel 100, display quality may deteriorate, or the display panel 100 may be damaged.

In a case, for example, as shown in FIG. 5, two frame delay may occur. When the input image data of an (N−1)-th frame represents 0 grayscale value, and the input image data of the N-th frame, the input image data of the (N+1)-th frame, and the input image data of the (N+2)-th frame represent 255 grayscale value, due to the delay of two frame, the grayscale adjustment operation GC and the power voltage control operation VC may not be performed in the N-th frame and the (N+1)-th frame. Here, N is greater than 2. In this case, the luminance of the display image of the N-th frame may be high, and the power current applied to the display panel 100 in the N-th frame may have an overcurrent level. As such, when an overcurrent flows through the display panel 100, display quality may deteriorate, or the display panel 100 may be damaged.

in an embodiment of the invention, the display device may be which sense the power current applied to the display panel 100, and generate the power voltage based on a current level of the power current to prevent the overcurrent from flowing in the display panel 100.

Figure 8:
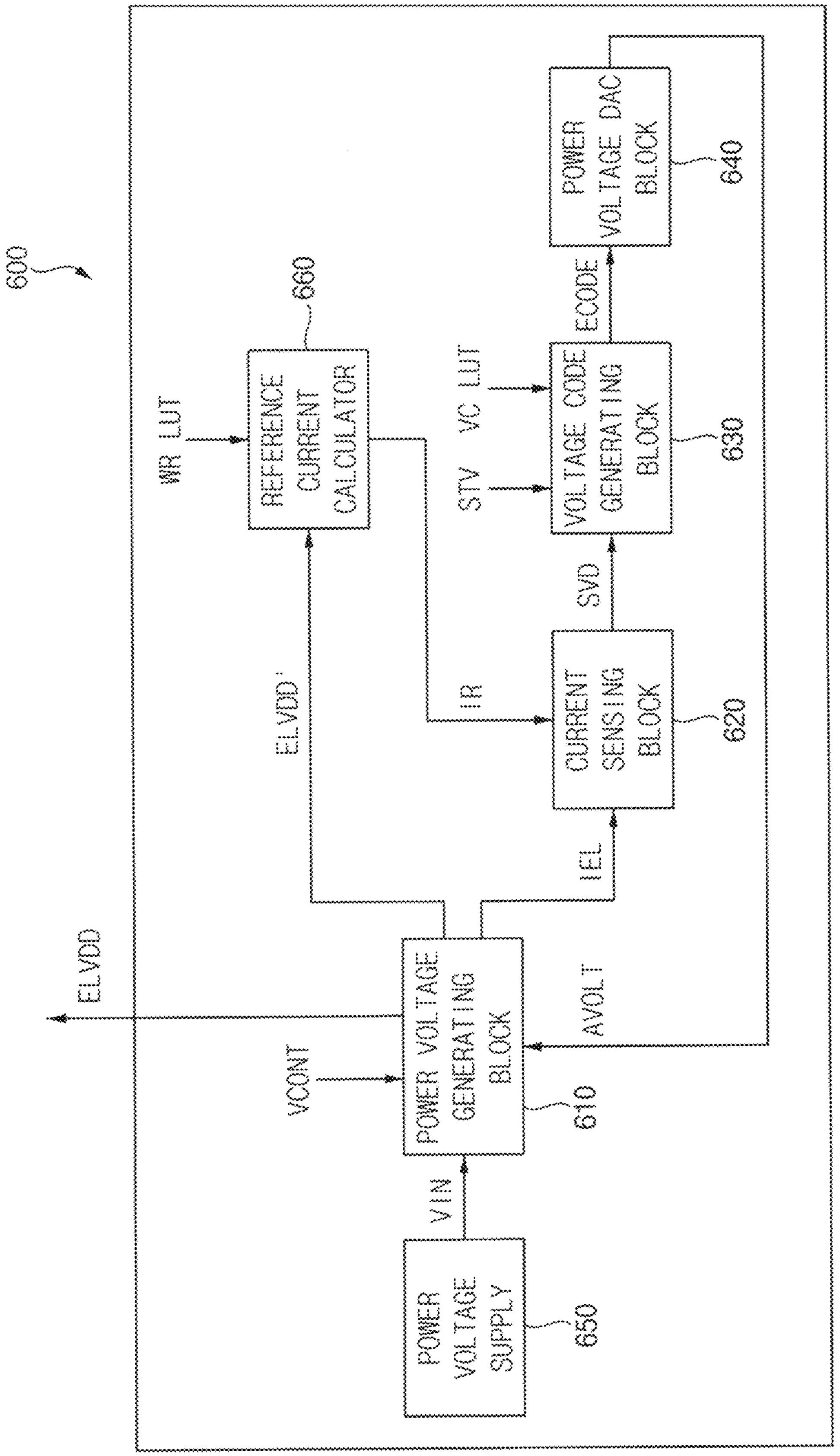
FIG. 8 is a block diagram illustrating an embodiment of a power voltage generator included in the display device of FIG. 1.
Figure 9:
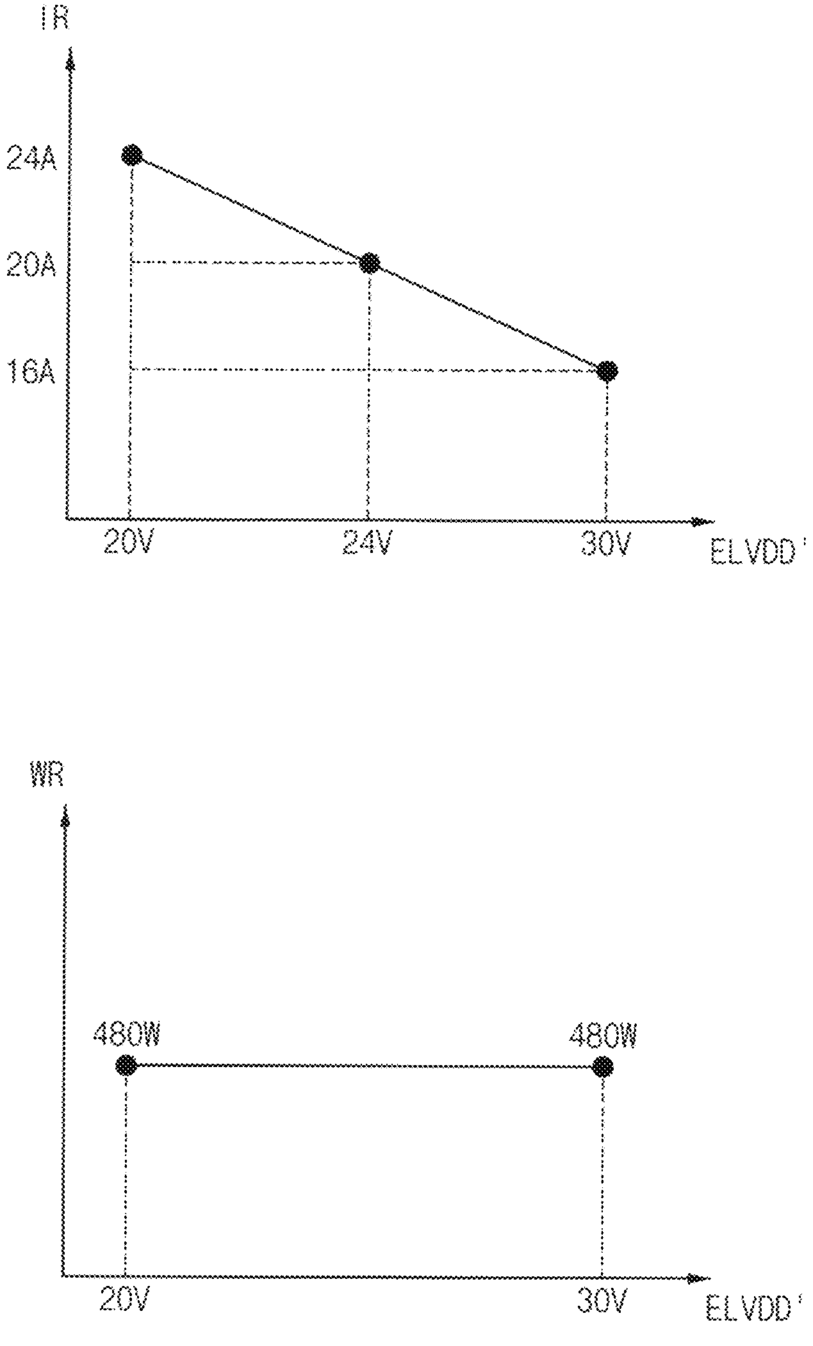
FIG. 9 is a graph illustrating an embodiment in which the display device of FIG. 1 calculates a reference current.
Figure 10:
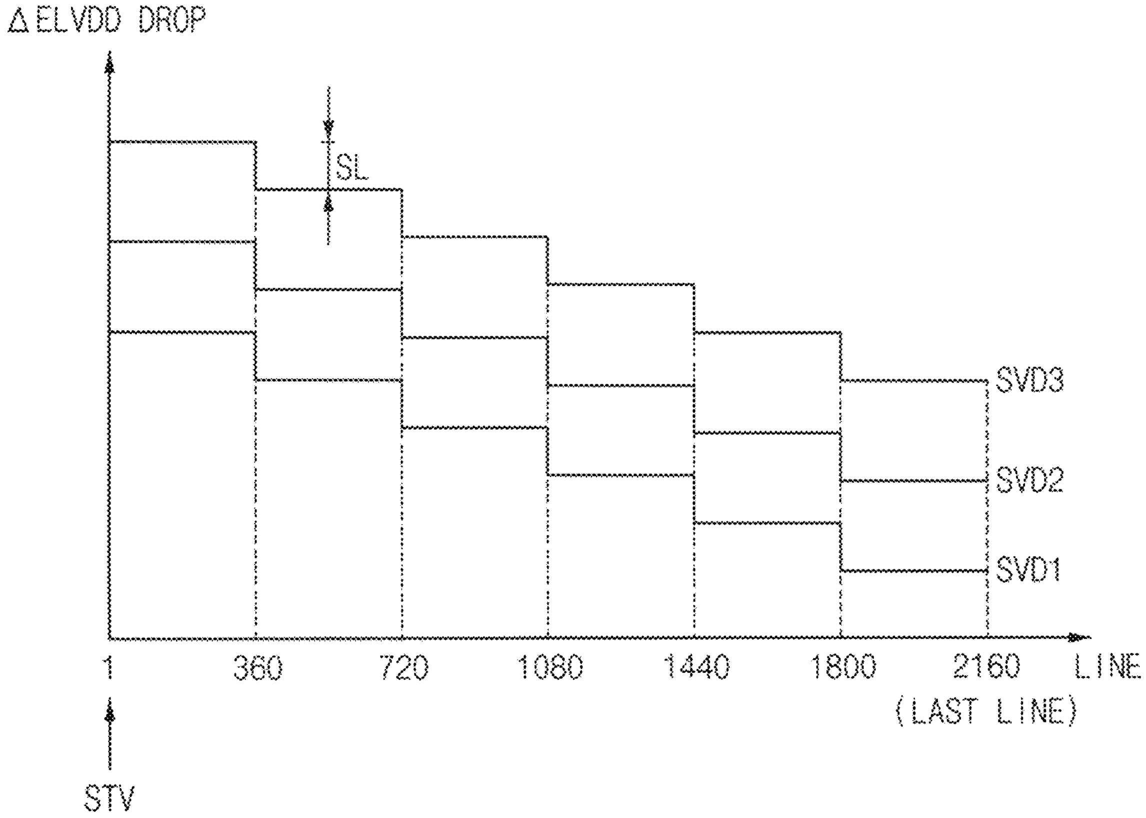
FIG. 10 is a graph illustrating an embodiment of power voltage drop data stored in a voltage code lookup table.
Figure 11:
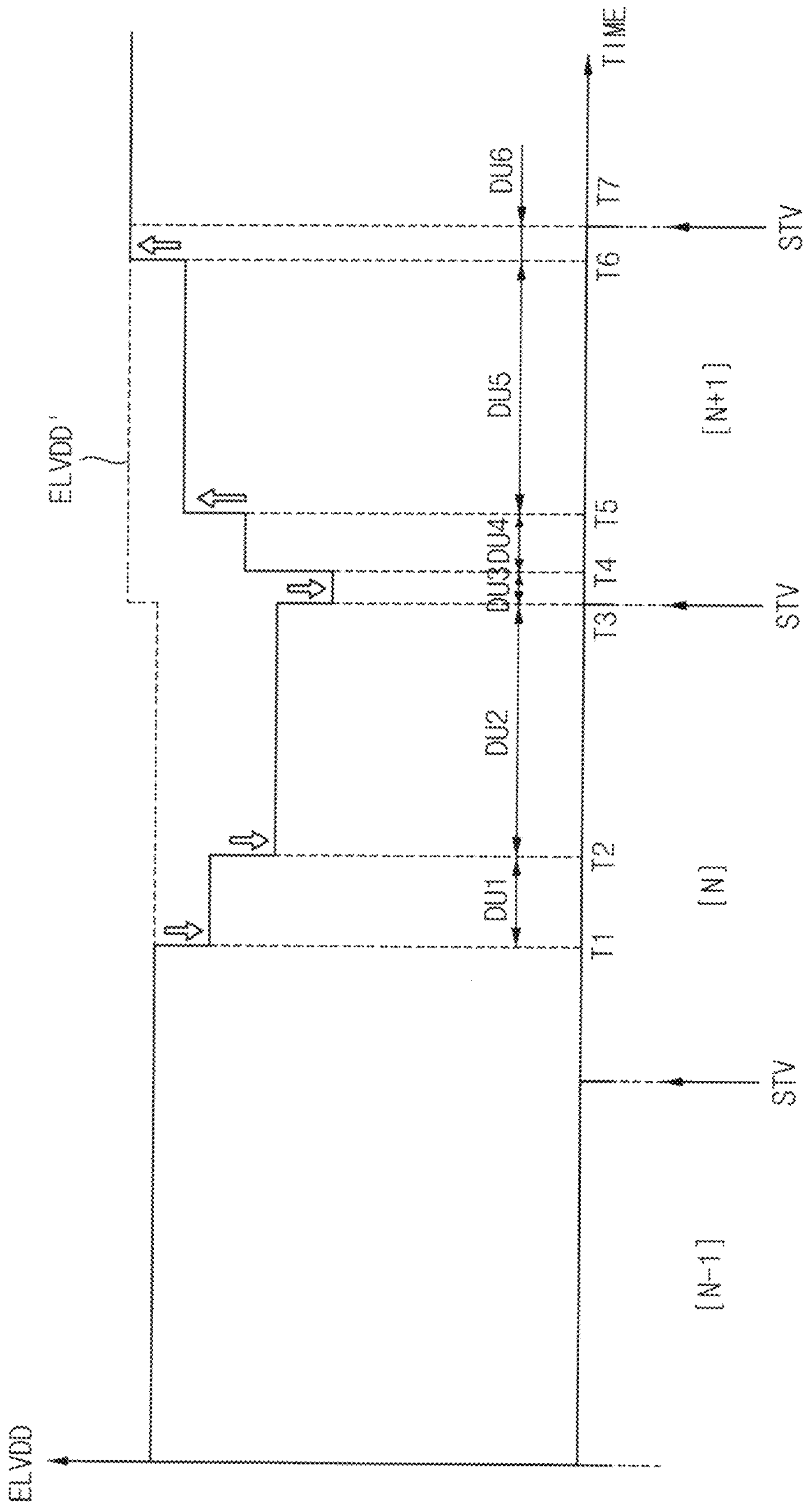
FIG. 11 is a graph illustrating an embodiment in which the display device of FIG. 1 controls a power voltage.
Figure 12:
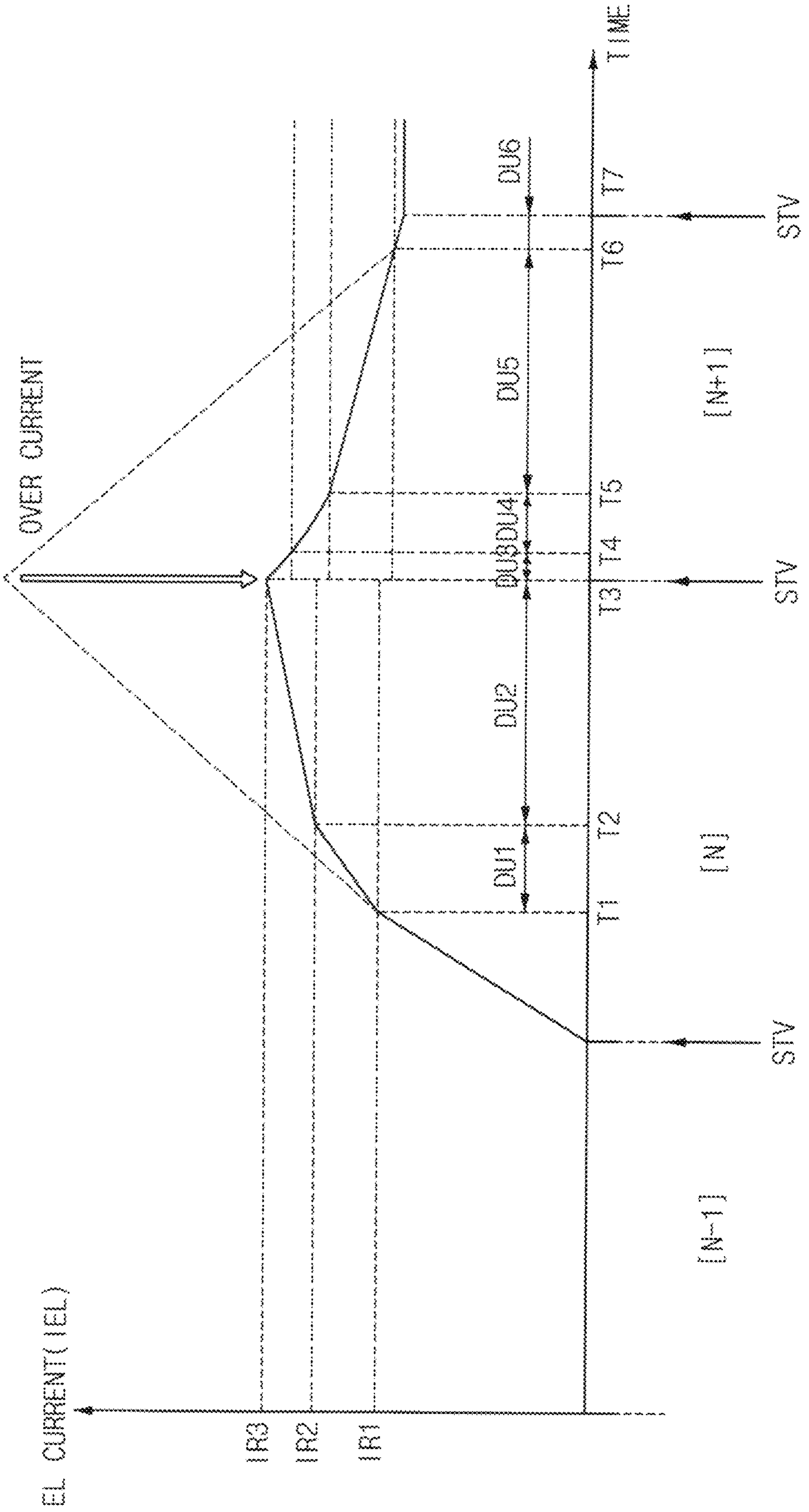
FIG. 12 is a graph illustrating an embodiment in which a power current is varied according to a controlling of the power voltage of FIG. 11.

FIG. 8 is a block diagram illustrating an embodiment of the power voltage generator 600 included in the display device of FIG. 1, FIG. 9 is a graph illustrating an embodiment in which the display device of FIG. 1 calculates a reference current IR, FIG. 10 is a graph illustrating an embodiment of power voltage drop data stored in a voltage code lookup table VC LUT, FIG. 11 is a graph illustrating an embodiment in which the display device of FIG. 1 controls the power voltage, and FIG. 12 is a graph illustrating an embodiment in which the power current IEL is varied according to a controlling of the power voltage of FIG. 11.

Referring to FIGS. 1 to 4, and 8 to 12, an embodiment of the display device may generate the voltage control signal VCONT[N+M] for adjusting the first power voltage ELVDD applied to the display panel 100 in the (N+M)-th frame based on the maximum grayscale MG of the input image data IMG[N] of the N-th frame, sense the power current IEL applied to the display panel 100 in the (N+M)-th frame, and control a voltage level of the first power voltage ELVDD applied to the display panel 100 in the (N+M) frame based on the second power voltage ELVDD' generated based on the voltage control signal VCONT[N+M] for adjusting the first power voltage ELVDD applied to the display panel 100 in the (N+M)-th frame and the current level of the power current IEL sensed in the (N+M)-th frame.

In an embodiment, the power voltage generator 600 may sense the power current IEL applied to the display panel 100, generate the first power voltage ELVDD and the second power voltage ELVDD', and control the voltage level of the first power voltage ELVDD based on the second power voltage ELVDD' and the current level of the power current IEL. In an embodiment, the power voltage generator 600 may sense the power current IEL applied to the display panel 100, generate the first ground power voltage ELVSS and the second ground power voltage ELVSS', and control the voltage level of the first ground power voltage ELVSS based on the second ground power voltage ELVSS' and the current level of the power current IEL.

The power voltage generator 600 may include a power voltage generating block 610, a current sensing block 620, a voltage code generating block 630, a power voltage digital-to-analog converter (DAC) block 640, a power voltage supply 650, and a reference current calculator 660. The power voltage generator 600 may generate the first power voltage ELVDD and output the first power voltage ELVDD to the display panel 100.

The reference current calculator 660 may calculate the reference current IR based on the voltage level of the second power voltage ELVDD' and a reference power consumption lookup table WR LUT. The reference current calculator 660 may receive a reference power consumption WR from the reference power consumption lookup table WR LUT, and calculate the reference current IR by dividing the reference power consumption WR by the voltage level of the second power voltage ELVDD'. According to an embodiment, the reference power consumption lookup table WRLUT may store the reference power consumption WR for the maximum power consumption of the power voltage supply 650. The reference power consumption WR may be less than or equal to the maximum power consumption of the power voltage supply 650. The maximum power consumption of the power voltage supply 650 may vary or be variously determined according to spec of the power voltage supply 650. In an embodiment, for example, when the maximum power consumption of the power voltage supply 650 is 500 watts (W), the reference power consumption WR may be less than or equal to 500 W. Since the reference current IR is calculated based on the reference power consumption WR less than or equal to the maximum power consumption and the voltage level of the second power voltage ELVDD' (i.e., the voltage level determined based on the maximum grayscale value MG of the input image data IMG), the reference current IR may reflect the voltage level of the first power voltage ELVDD adjusted by the maximum grayscale value MG of the input image data IMG. Accordingly, the display device may effectively prevent the power voltage supply 650 from excessive heat generation and burnt due to a overcurrent flowing the display device.

In an embodiment, for example, as shown in FIG. 9, the reference power consumption WR may be 480 W. When the voltage level of the second power voltage ELVDD' is 20 volts (V), the reference current IR may be 24 amperes (A) (i.e., $480/20=24$). When the voltage level of the second power voltage ELVDD' is 24 V, the reference current IR may be 20 A (i.e., $480/24=20$). When the voltage level of the second power voltage ELVDD' is 30 V, the reference current IR may be 16 A (i.e., $480/30=16$). The display device may change the reference current IR as the second power voltage ELVDD' is changed. Accordingly, the display device may effectively prevent the power voltage supply 650 from excessive heat generation and burnt by lowering the reference current IR as the second power voltage ELVDD' increases.

The current sensing block 620 may sense the power current IEL and generate a voltage drop signal SVD based on the current level of the power current IEL and the reference current IR. The current sensing block 620 may receive the power current IEL from the power voltage generating block 610. The current sensing block 620 may compare the power current IEL with the reference current IR. The current sensing block 620 may output the voltage drop signal SVD with an activation level when the power current IEL is greater than the reference current IR.

In an embodiment, the current sensing block 620 may receive the power current IEL from the power voltage generating block 610. When the grayscale adjustment operation and the power voltage adjustment operation are not performed in the N-th frame (GC/VC OFF) (e.g., shown in FIG. 4, the input image data (IMG[N−1]) of the (N−1)-th frame) represents 0 grayscale value and the input image data IMG[N] of the N-th frame represents 255 grayscale value), the power current IEL applied to the display panel 100 in the N-th frame may have an overcurrent level. The current sensing block 620 may sense whether the power current IEL has the overcurrent level. In such an embodiment, the current sensing block 620 may receive the reference current IR to sense whether the power current IEL has the overcurrent level.

In an embodiment, the reference power consumption WR may include a first reference power consumption, a second reference power consumption greater than the first reference power consumption, and a third reference power consumption greater than the second reference power consumption. The third reference power consumption may be less than or equal to the maximum power consumption of the power voltage supply 650. The reference current IR may include a first reference current IR1, a second reference current IR2, and a third reference current IR3, the first reference current IR1 may be calculated by dividing the first reference power consumption by the voltage level of the second power voltage ELVDD', the second reference current IR2 may be calculated by dividing the second reference power consumption by the voltage level of the second power voltage ELVDD', and the third reference current IR3 may be calculated by dividing the third reference power consumption by the voltage level of the second power voltage ELVDD'. The second reference current IR2 may be greater than the first reference current IR1. The third reference current IR3 may be greater than the second reference current IR2.

In an embodiment, the current sensing block 620 may compare the power current IEL and the first reference current IR1. The current sensing block 620 may output a first voltage drop signal SVD1 with an activation level when the power current IEL is greater than the first reference current IR1. In an embodiment, the current sensing block 620 may compare the power current IEL and the second reference current IR2. The current sensing block 620 may output a second voltage drop signal SVD2 with an activation level when the power current IEL is greater than the second reference current IR2. In an embodiment, the current sensing block 620 may compare the power current IEL and the third reference current IR3. The current sensing block 620 may output a third voltage drop signal SVD3 with an activation level when the power current IEL is greater than the third reference current IR3.

The voltage code generating block 630 may output the power voltage code ECODE corresponding to a type of the voltage drop signal SVD and a activation start time of the voltage drop signal SVD among a plurality of power voltage codes ECODE stored in the voltage code lookup table VC LUT. In an embodiment, for example, the type of the voltage drop signal SVD may be one of the first voltage drop signal SVD1, the second voltage drop signal SVD2, and the third voltage drop signal SVD3, as shown in FIG. 10.

The voltage code generating block 630 may receive the vertical start signal from the driving controller 200. The vertical start signal STV may be a signal representing the start of the N-th frame. The voltage code generating block 630 may calculate the activation start time of the voltage drop signal SVD based on the vertical start signal. In an embodiment, for example, the voltage code generating block 630 may calculate a line to which the voltage drop signal SVD is input with the activation level. The line to which the voltage drop signal SVD is input with the activation level may be proportional to the activation start time of the voltage drop signal SVD. The voltage code generating block 630 may compare the vertical start signal with the line to which the voltage drop signal SVD is input with the activation level to calculate the activation start time of the voltage drop signal SVD.

In an embodiment, as shown in FIG. 10, the voltage code lookup table VC LUT may store drop data of the first power voltage ELVDD corresponding to the type of the voltage drop signal SVD and the activation start time of the voltage drop signal SVD. As the activation start time of the voltage drop signal SVD becomes earlier, the voltage level of the first power voltage ELVDD may drop more. In an embodiment, for example, the voltage level of the first power voltage ELVDD may drop more in a case where the line to which the voltage drop signal SVD is input with the activation level is a first line as compared with a case where the line to which the voltage drop signal SVD is input with the activation level is a last line or a $2160^{th}$ line. As the voltage drop signal SVD becomes a voltage drop signal SVD according to a higher reference current, the voltage level of the first power voltage ELVDD may drop more. In an embodiment, for example, the voltage level of the first power voltage ELVDD may drop more in a case where the third voltage drop signal SVD3 is input as compared with a case where the first voltage drop signal SVD1 is input. In this case, the voltage level of the first power voltage ELVDD may drop by a step level SL. The voltage code generating block 630 may output the power voltage code ECODE to the power voltage DAC block 640.

The power voltage DAC block 640 may receive the power voltage code ECODE from the voltage code generating block 630. The power voltage DAC block 640 may generate an analog voltage AVOLT corresponding to the power voltage code ECODE. The power voltage DAC block 640 may output the analog voltage AVOLT to the power voltage generating block 610.

The power voltage supply 650 may apply an input voltage VIN to the power voltage generating block 610. In an embodiment, for example, the power voltage supply 650 may be a switching mode power supply (SMPS). The power voltage generating block 610 may generate the second power voltage ELVDD' based on the input voltage VIN, and control the voltage level of the first power voltage ELVDD based on the second power voltage ELVDD' and the analog voltage AVOLT. When the power voltage control operation VC is performed, the power voltage generating block 610 may generate the first power voltage ELVDD based on the input voltage VIN and the voltage control signal VCONT. The power voltage generating block 610 may receive the analog voltage AVOLT from the power voltage DAC block 640. The power voltage generating block 610 may control the voltage level of the first power voltage ELVDD based on the analog voltage AVOLT.

The voltage level of the first power voltage ELVDD may be a voltage level lowered by the analog voltage AVOLT based on the voltage level of the second power voltage ELVDD'. In an embodiment, for example, when the voltage level of the second power voltage ELVDD' is 10 V and the voltage level of the first power voltage ELVDD is decreased by 1 V by the analog voltage AVOLT, the voltage level of the first power voltage ELVDD may be 9 V. Also, when the voltage drop signal SVD is not activated, the voltage level of the first power voltage ELVDD may be the same as the voltage level of the second power voltage ELVDD'. That is, the voltage level of the first power voltage ELVDD before being controlled based on the second power voltage ELVDD' and the analog voltage AVOLT may be the same as the voltage level of the second power voltage ELVDD'.

When the voltage level of the first power voltage ELVDD drops or rises based on the analog voltage AVOLT, the current level of the power current IEL flowing in the display panel 100 may vary. Therefore, in an embodiment of the display device, the voltage level of the first power voltage ELVDD may be controlled when the overcurrent flows in the display panel 100, such that occurrence of the overcurrent may be minimized, and the display panel 100 may be effectively prevented from being damaged.

FIGS. 1 to 4, and 8 to 12, an embodiment of the power voltage generator 600 may control the first power voltage ELVDD based on the voltage level of the second power voltage ELVDD' and the current level of the power current IEL. When the first power voltage ELVDD is controlled, the current level of the power current IEL may be varied. FIGS. 11 and 12 show an embodiment where M is 1.

At a first time point T1, the current sensing block 620 may sense that the power current IEL is greater than the first reference current IR1. The first reference current IR1 may have a current level that does not damage the display panel 100. The current sensing block 620 may output the first voltage drop signal SVD1 with the activation level to the voltage code generating block 630. The voltage code generating block 630 may output the power voltage code ECODE based on the first voltage drop signal SVD1 at the first time point T1. The power voltage DAC block 640 may output the analog voltage AVOLT corresponding to the power voltage code ECODE to the power voltage generating block 610. The power voltage generating block 610 may decrease the voltage level of the first power voltage ELVDD based on the analog voltage AVOLT. When the first power voltage ELVDD drops at the first time point T1, a slope of the power current IEL may vary. In an embodiment, the power current IEL may have a smaller increase (or increase rate) during a first period DU1 from the first time point T1 to a second time point T2 than that during a period before the first period DU1.

At the second time point T2, the current sensing block 620 may sense that the power current IEL is greater than the second reference current IR2. The second reference current IR2 may have a higher current level than the first reference current IR1. The current sensing block 620 may output the second voltage drop signal SVD2 with the activation level to the voltage code generating block 630. The voltage code generating block 630 may output the power voltage code ECODE based on the second voltage drop signal SVD2 at the second time point T2. The power voltage DAC block 640 may output the analog voltage AVOLT corresponding to the power voltage code ECODE to the power voltage generating block 610. The power voltage generating block 610 may decrease the voltage level of the first power voltage ELVDD based on the analog voltage AVOLT. When the first power voltage ELVDD drops at the second time point T2, the slope of the power current IEL may vary. In an embodiment, the power current IEL may have a smaller increase during a second period DU2 from the second time point T2 to a third time point T3 than that during the first period DU1.

At the third time point T3, as described above, the voltage level of the first power supply voltage ELVDD may be increased by the voltage control signal VCONT generated by the power voltage control operation VC in the N-th frame. And, since the voltage level of the first power voltage ELVDD increases, the voltage level of the second power supply voltage ELVDD' may be increased. Also, since the voltage level of the second power voltage ELVDD' is increased, the reference current IR (or the first to third reference currents) may also decrease. The current sensing block 620 may sense that the power current IEL is greater than the third reference current IR3. The third reference current IR3 may be a minimum overcurrent that damages the display panel 100. The current sensing block 620 may output the third voltage drop signal SVD3 with the activation level to the voltage code generating block 630. The voltage code generating block 630 may output the power voltage code ECODE based on the third voltage drop signal SVD3 at the third time point T3. The power voltage DAC block 640 may output the analog voltage AVOLT corresponding to the power voltage code ECODE to the power voltage generating block 610. The power voltage generating block 610 may decrease the voltage level of the first power voltage ELVDD based on the analog voltage AVOLT. When the first power voltage ELVDD drops at the third time point T3, the slope of the power current IEL may vary. In an embodiment, the power current IEL may decrease during a third period DU3 from the third time point T3 to a fourth time point T4.

At the fourth time point T4, the current sensing block 620 may sense that the power current IEL is smaller than the third reference current IR3. The current sensing block 620 may output the third voltage drop signal SVD3 with the deactivation level to the voltage code generating block 630. In this case, the power voltage generating block 610 may increase the voltage level of the first power voltage ELVDD. When the first power voltage ELVDD rises at the fourth time point T4, the slope of the power current IEL may vary. In an embodiment, the power current IEL may have a smaller decrease during a fourth period DU4 from the fourth time point T4 to a fifth time point T5 than that during the third period DU3.

At the fifth time point T5, the current sensing block 620 may sense that the power current IEL is smaller than the second reference current IR2. The current sensing block 620 may output the second voltage drop signal SVD2 with a deactivation level to the voltage code generating block 630. In this case, the power voltage generating block 610 may increase the voltage level of the first power voltage ELVDD. When the first power voltage ELVDD rises at the fifth time point T5, the slope of the power current IEL may vary. In other words, the power current IEL may have a smaller decrease during a fourth period DU5 from the fifth time point T5 to a sixth time point T6 than that during the third period DU4.

At the sixth time point T6, the current sensing block 620 may sense that the power current IEL is smaller than the first reference current IR1. The current sensing block 620 may output the first voltage drop signal SVD1 with a deactivation level to the voltage code generating block 630. In this case, the power voltage generating block 610 may increase the voltage level of the first power voltage ELVDD. When the first power voltage ELVDD rises at the sixth time point T6, the slope of the power current IEL may vary. In other words, the power current IEL may have a smaller decrease during a fifth period DU6 from the sixth time point T6 to a seventh time point T7 than that during the fourth period DU5.

In an embodiment, as described above, when the voltage level of the first power voltage ELVDD drops or rises based on the analog voltage AVOLT, the current level of the power current IEL flowing in the display panel 100 may vary during the first period DU1 to the sixth period DU6. Therefore, according to an embodiment of the display device, the voltage level of the first power voltage ELVDD may be controlled when the overcurrent flows in the display panel 100, so that the occurrence of the overcurrent may be minimized, and the display panel 100 may be effectively prevented from being damaged.

Figure 13:
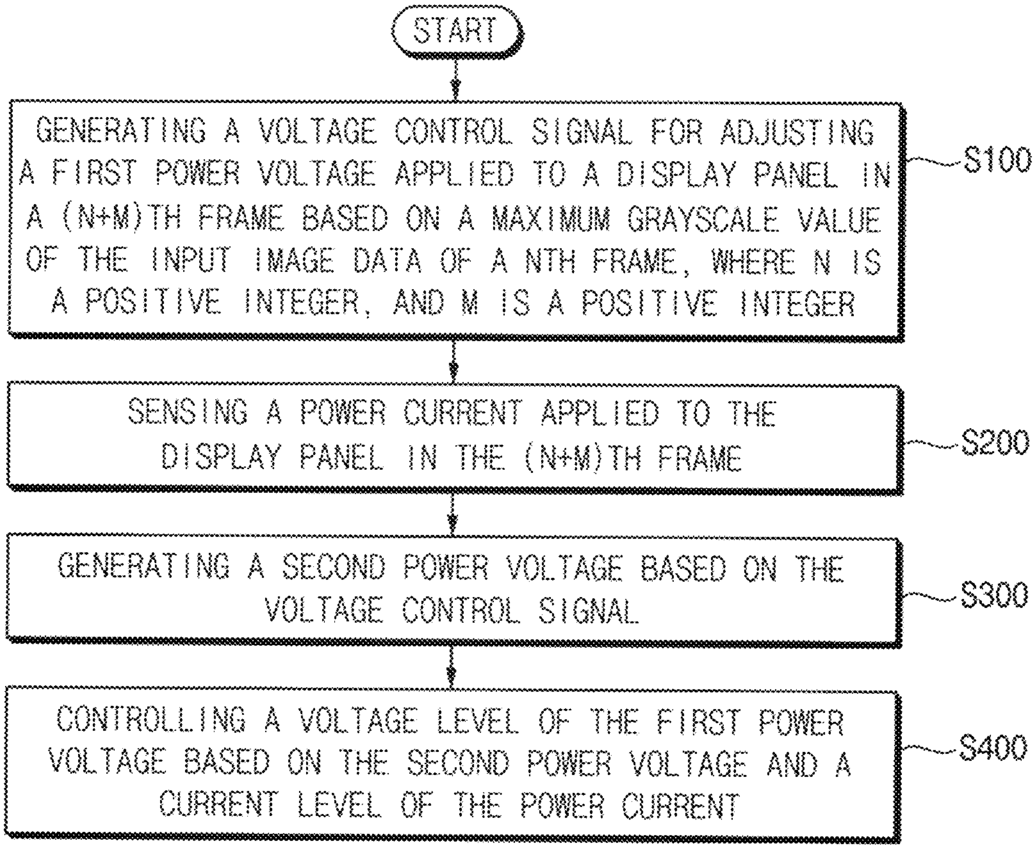
FIG. 13 is a flowchart illustrating an embodiment of a method of driving the display device of FIG. 1.

FIG. 13 is a flowchart illustrating an embodiment of a method of driving the display device of FIG. 1.

Referring to FIG. 13, an embodiment of a method of driving the display device may include generating a voltage control signal for adjusting a first power voltage applied to a display panel in an (N+M)-th frame based on a maximum grayscale value of the input image data of an N-th frame (S100), where N is a positive integer, and M is a positive integer, sensing a power current applied to the display panel in the (N+M)-th frame (S200), generate a second power voltage based on the voltage control signal (S300), and controlling a voltage level of the first power voltage based on the second power voltage and a current level of the power current (S400). In an embodiment, the display device may determine a scale factor for adjusting a grayscale value of the input image data of the (N+M)-th frame based on a load of the input image data of the N-th frame and a grayscale adjustment reference value.

In an embodiment, the method of driving the display device may further include controlling a voltage level of the first power voltage based on the second power voltage and a current level of the power current (S400). In an embodiment, the method of driving the display device may include calculating a reference current based on a voltage level of the second power voltage and a reference power consumption lookup table, generating a voltage drop signal based on the current level of the power current and the reference current, outputting a power voltage code based on the voltage drop signal and a voltage code lookup table, generating an analog voltage based on the power voltage code, and controlling the voltage level of the first power voltage based on the second power voltage and the analog voltage.

The reference current may be calculated by dividing the reference power consumption received from the reference power consumption lookup table by the voltage level of the second power voltage. The reference power consumption may include a first reference power consumption, a second reference power consumption greater than the first reference power consumption, and a third reference power consumption greater than the second reference power consumption. The reference current may include a first reference current, a second reference current, and a third reference current, the first reference current may be calculated by dividing the first reference power consumption by the voltage level of the second power voltage, the second reference current may be calculated by dividing the second reference power consumption by the voltage level of the second power voltage, and the third reference current may be calculated by dividing the third reference power consumption by the voltage level of the second power voltage.

In an embodiment, the method of driving the display device may include outputting a first voltage drop signal with an activation level when the power current is greater than the first reference current, outputting a second voltage drop signal with an activation level when the power current is greater than the second reference current, and outputting a third voltage drop signal with an activation level when the power current is greater than the third reference current.

In an embodiment, the method of driving the display device may include calculating an activation start time of the voltage drop signal based on a vertical start signal, and outputting the power voltage code corresponding to a type of the voltage drop signal and the activation start time of the voltage drop signal among a plurality of power voltage codes stored in the voltage code lookup table.

Figure 14:
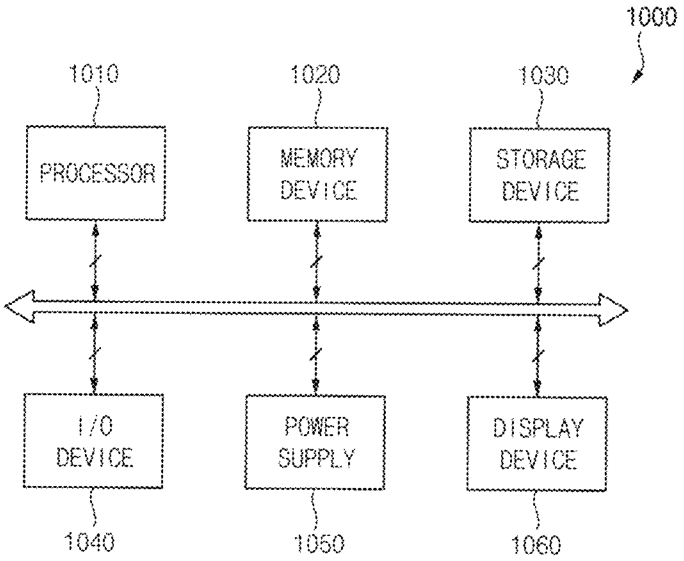
FIG. 14 is a block diagram showing an electronic device according to embodiments.
Figure 15:
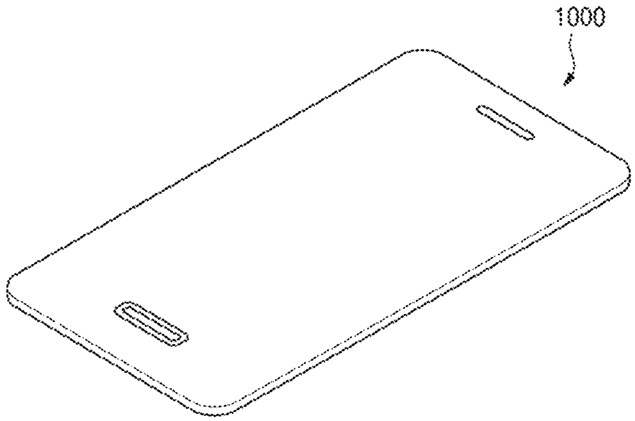
FIG. 15 is a diagram showing an embodiment in which the electronic device of FIG. 11 is implemented as a smart phone.

FIG. 14 is a block diagram showing an electronic device 1000 according to embodiments, and FIG. 15 is a diagram showing an embodiment in which the electronic device 1000 of FIG. 11 is implemented as a smart phone.

Referring to FIGS. 14 and 15, an embodiment of the electronic device 1000 may include a processor 1010, a memory device 1020, a storage device 1030, an input/output (I/O) device 1040, a power supply 1050, and a display device 1060. In such an embodiment, the display device 1060 may be the display device of FIG. 1. In an embodiment, the electronic device 1000 may further include a plurality of ports for communicating with a video card, a sound card, a memory card, a universal serial bus (USB) device, other electronic devices, etc. In an embodiment, as shown in FIG. 15, the electronic device 1000 may be implemented as a smart phone. However, the electronic device 1000 is not limited thereto. In an embodiment, for example, the electronic device 1000 may be implemented as a cellular phone, a video phone, a smart pad, a smart watch, a tablet personal computer (PC), a car navigation system, a computer monitor, a laptop, a head mounted display (HMD) device, etc.

The processor 1010 may perform various computing functions. The processor 1010 may be a micro-processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus. The memory device 1020 may store data for operations of the electronic device 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc. The storage device 1030 may include a solid state drive (SSD) device, a hard disk drive (HDD) device, a CD-ROM device, etc. The I/O device 1040 may include an input device such as a keyboard, a keypad, a mouse device, a touch pad, a touch screen, etc., and an output device such as a printer, a speaker, etc. In some embodiments, the I/O device 1040 may include the display device 1060. The power supply 1050 may provide power for operations of the electronic device 1000. The display device 1060 may be coupled to other components via the buses or other communication links.

Embodiments of the invention may be applied to any electronic device including the display device. In an embodiment, for example, the invention s may be applied to a television (TV), a digital TV, a three-dimensional (3D) TV, a mobile phone, a smart phone, a tablet computer, a virtual reality (VR) device, a wearable electronic device, a (PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel which displays an image based on input image data;

a driving controller which generates a voltage control signal for adjusting a first power voltage applied to the display panel in an (N+M)-th frame based on a maximum grayscale value of the input image data of an N-th frame, wherein N is a positive integer, and M is a positive integer; and a power voltage generator which senses a power current applied to the display panel in the (N+M)-th frame, generates a second power voltage based on the voltage control signal, and controls a voltage level of the first power voltage based on the second power voltage and a current level of the power current.

2. The display device of claim 1, wherein the driving controller determines a scale factor for adjusting a grayscale value of the input image data of the (N+M)-th frame based on a load of the input image data of the N-th frame and a grayscale adjustment reference value.

3. The display device of claim 2, wherein the power voltage generator includes:

a power voltage generating block which generates the first power voltage and the second power voltage based on an input voltage and the voltage control signal, and controls the voltage level of the first power voltage based on the second power voltage and an analog voltage;

a power voltage supply which applies the input voltage to the power voltage generating block;

a reference current calculator which calculates a reference current based on a voltage level of the second power voltage and a reference power consumption lookup table;

a current sensing block which senses the power current and generates a voltage drop signal based on the current level of the power current and the reference current;

a voltage code generating block which outputs a power voltage code based on the voltage drop signal and a voltage code lookup table; and a power voltage digital-to-analog converter block which generates the analog voltage based on the power voltage code.

4. The display device of claim 3, wherein the reference current calculator receives a reference power consumption from the reference power consumption lookup table, and calculates the reference current by dividing the reference power consumption by the voltage level of the second power voltage.

5. The display device of claim 4, wherein the reference power consumption includes a first reference power consumption, a second reference power consumption greater than the first reference power consumption, and a third reference power consumption greater than the second reference power consumption, wherein the reference current includes a first reference current, a second reference current, and a third reference current, wherein the first reference current is calculated by dividing the first reference power consumption by the voltage level of the second power voltage, wherein the second reference current is calculated by dividing the second reference power consumption by the voltage level of the second power voltage, and wherein the third reference current is calculated by dividing the third reference power consumption by the voltage level of the second power voltage.

6. The display device of claim 5, wherein the third reference power consumption is less than or equal to a maximum power consumption of the power voltage supply.

7. The display device of claim 5, wherein the current sensing block outputs a first voltage drop signal with an activation level when the power current is greater than the first reference current, outputs a second voltage drop signal with an activation level when the power current is greater than the second reference current, and outputs a third voltage drop signal with an activation level when the power current is greater than the third reference current.

8. The display device of claim 3, wherein the voltage code generating block is which receives the voltage drop signal from the current sensing block, receives a vertical start signal from the driving controller, and calculates an activation start time of the voltage drop signal based on the vertical start signal.

9. The display device of claim 8, wherein the voltage code generating block outputs the power voltage code corresponding to a type of the voltage drop signal and the activation start time of the voltage drop signal among a plurality of power voltage codes stored in the voltage code lookup table.

10. The display device of claim 9, wherein the power voltage generating block receives the analog voltage from the power voltage digital-to-analog converter block and controls the voltage level of the first power voltage based on the analog voltage.

11. The display device of claim 2, wherein the driving controller further includes:

a load sum calculator which receives the input image data of the N-th frame to calculate a sum of all grayscale values of the input image data of the N-th frame; and a load calculator which receives the sum of all grayscale values of the input image data of the N-th frame to calculate the load of the input image data of the N-th frame.

12. The display device of claim 11, wherein the driving controller further includes:

a maximum grayscale value calculator which receives the input image data of the N-th frame and calculates the maximum grayscale value of the input image data of the N-th frame.

13. The display device of claim 12, wherein the driving controller further includes:

a voltage control signal generating block which generates the voltage control signal for adjusting the first power voltage applied to the display panel in the (N+M)-th frame based on the load of the input image data of the N-th frame, the maximum grayscale value of the input image data of the N-th frame, and a voltage control lookup table; and a grayscale adjuster which determines the scale factor for adjusting the grayscale value of the input image data of the (N+M)-th frame based on the load of the input image data of the N-th frame and the grayscale adjustment reference value.

14. A method of driving a display device, the method comprising:

generating a voltage control signal for adjusting a first power voltage applied to a display panel of the display device in an (N+M)-th frame based on a maximum grayscale value of input image data of an N-th frame, wherein N is a positive integer, and M is a positive integer;

sensing a power current applied to the display panel in the (N+M)-th frame;

generating a second power voltage based on the voltage control signal; and controlling a voltage level of the first power voltage based on the second power voltage and a current level of the power current.

15. The method of claim 14, further comprising:

determining a scale factor for adjusting a grayscale value of the input image data of the (N+M)-th frame based on a load of the input image data of the N-th frame and a grayscale adjustment reference value.

16. The method of claim 15, the controlling the voltage level of the first power voltage includes:

calculating a reference current based on a voltage level of the second power voltage and a reference power consumption lookup table;

generating a voltage drop signal based on the current level of the power current and the reference current;

outputting a power voltage code based on the voltage drop signal and a voltage code lookup table;

generating an analog voltage based on the power voltage code; and controlling the voltage level of the first power voltage based on the second power voltage and the analog voltage.

17. The method of claim 16, wherein the reference current is calculated by dividing a reference power consumption received from the reference power consumption lookup table by the voltage level of the second power voltage.

18. The method of claim 17, wherein the reference power consumption includes a first reference power consumption, a second reference power consumption greater than the first reference power consumption, and a third reference power consumption greater than the second reference power consumption, wherein the reference current includes a first reference current, a second reference current, and a third reference current, wherein the first reference current is calculated by dividing the first reference power consumption by the voltage level of the second power voltage, wherein the second reference current is calculated by dividing the second reference power consumption by the voltage level of the second power voltage, and wherein the third reference current is calculated by dividing the third reference power consumption by the voltage level of the second power voltage.

19. The method of claim 18, the outputting the power voltage code includes:

outputting a first voltage drop signal with an activation level when the power current is greater than the first reference current;

outputting a second voltage drop signal with an activation level when the power current is greater than the second reference current; and outputting a third voltage drop signal with an activation level when the power current is greater than the third reference current.

20. The method of claim 16, the outputting the power voltage code includes:

calculating an activation start time of the voltage drop signal based on a vertical start signal; and outputting the power voltage code corresponding to a type of the voltage drop signal and the activation start time of the voltage drop signal among a plurality of power voltage codes stored in the voltage code lookup table.

* * * * *